Oct. 5, 1926.
C. L. SEIBEL
HEAT DISTRIBUTOR
Filed Jan. 7, 1926
1,602,048
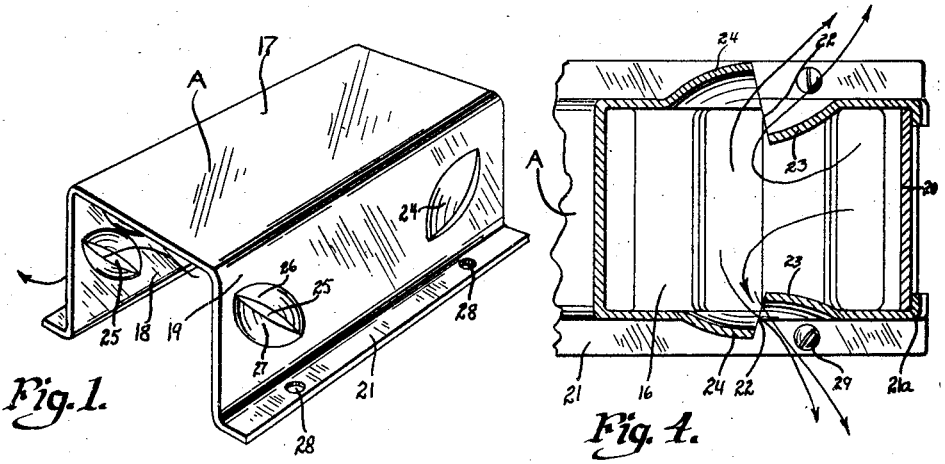
Fig. 1.
Fig. 4.
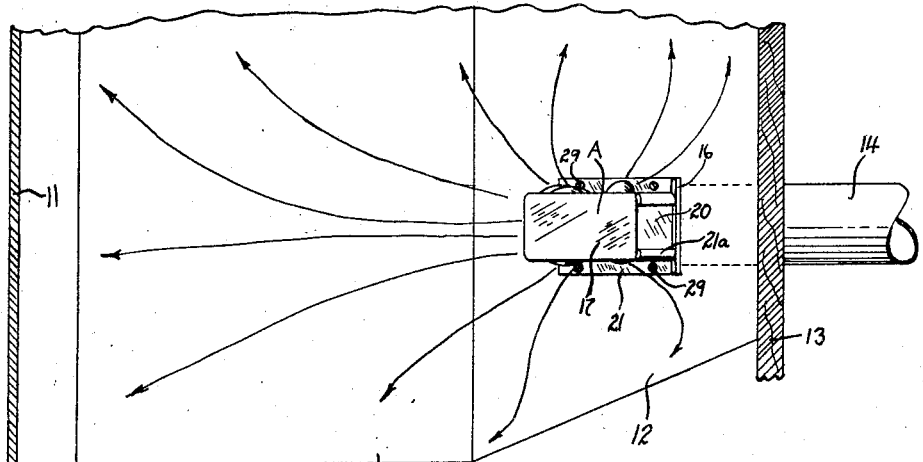
Fig. 2.
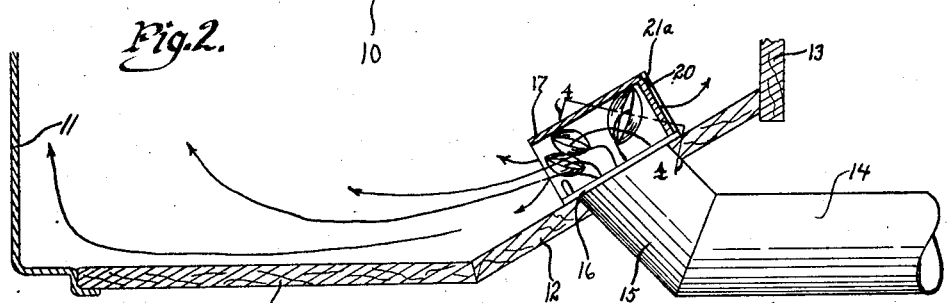
Fig. 3.
Witness
Inventor
Charles L. Seibel
by Bair & Freeman Attorneys Patented Oct. 5, 1926.

1,602,048

UNITED STATES PATENT OFFICE.

CHARLES L. SEIBEL, OF PATON, IOWA.

HEAT DISTRIBUTOR.

Application filed January 7, 1926. Serial No. 79,783.

The object of my invention is to provide a heat distributor of simple, durable and inexpensive construction.

More particularly, it is my object to provide a heat distributor adapted to be supported on the inclined front floor board of a motor vehicle and to direct the hot air from certain known heaters in such manner as to distribute that heated air most effectively.

With these and other objects in view, my invention consists in the construction, arrangement and combination of the various parts of my heat distributor, whereby the objects contemplated are attained, as hereinafter more fully set forth, pointed out in my claims, and illustrated in the accompanying drawings, in which:

Figure 1 is a perspective view of a heat distributor embodying my invention.

Figure 2 is a top or plan view of the same, installed on the floor of an automobile, part of the dash of the motor vehicle being shown in section.

Figure 3 is a vertical, sectional view of the portion of the automobile body, showing my improved heat distributor in section, as it is installed in the motor vehicle; and Figure 4 is a detail, sectional view taken on the line 4—4 of Figure 3.

It has in recent years been quite common to install in many automobiles, heaters of the type, which provide some sort of hood over the exhaust manifold and a conducting pipe leading to the body of the motor vehicle.

It is quite a common practice to have this conducting pipe extend through the inclined front foot board and terminate at the upper surface thereof, and to provide the pipe with some sort of damper or adjustable closure member.

Where such a heater is employed, the hot air is shot into the car and directed upwardly and it travels upwardly so rapidly that the upper part of the car is likely to be quite warm, while the lower part and particularly that around the feet of the driver may be chilly or cold.

The object of my invention is to provide in connection with a heater of the general type mentioned a heat distributor so constructed as to direct the warm air rearwardly and laterally in the lower part of the car body, so as to cause the lower part of the car body to be heated first.

At the same time, I have provided a structure, which will not direct hot air directly against the legs or feet of the driver. This is of importance, because the air is warm enough to be uncomfortable, if directed directly against the legs of the driver.

The device that I have made is also so constructed that it may be assembled in place by removing bolts commonly used for the fastening of the floor plate of the heater, inserting them through flanges on my distributor, and then replacing them in their original position.

In the accompanying drawings, I have used the reference numeral 10 to indicate generally the horizontal floor portion of a motor vehicle, at the rear of which is the front part 11 of the front seat. Forwardly with relation to the floor board 10 is the inclined floor board 12 at the forward edge of which is the dash 13.

It is quite a common practice to provide a heater 14 and to provide a conducting pipe 15 leading therefrom through the floor board 12, as shown in Figure 3.

I have shown a heater of the type having the floor plate 16, which is ordinarily provided with some convenient sliding or other closure member.

My improved heat distributor comprises a downwardly opening channel-shaped member A, comprising a top 17, side walls 18 and 19, a forward end 20 and laterally, oppositely projecting flanges 21 at the lower edges of the walls 18 and 19.

This heat distributor may be made in a great variety of forms and constructed in many ways.

Preferably, I make it of sheet metal bending the sides 18 and 19 and the end 20 downwardly and forming the side members 18 and 19 at their rear ends with inwardly projecting flanges 21ª, overlapping the outer surface of the rear end member 20.

It will be seen that the distributor A will tend to direct the hot air downwardly and rearwardly to the floor of the car and toward the seat portion 11.

It is, also, desirable, of course, that some of the warmed air should be directed laterally and also that it should not be directed so as to strike the legs of the driver, when they are in driving position.

To accomplish this lateral direction of the air laterally and slightly forwardly on both sides of the heat distributor, I have cut in the forward portions of the side walls 18 and 19 diagonal slits extending from points near the forward, upper corners downwardly and laterally, as indicated at 22.

The metal forwardly of these slits is bent inwardly to form an inwardly projecting lip and guide portion 23, and the metal rearwardly of the slits is bent outwardly to form a directing lip 24.

It will be noted that the structure is such as to direct the air forwardly and laterally, as indicated by the arrows in Figure 4.

In the side wall 19, I have provided near the rear end thereof a similar slit 25, which, however, is inclined from its upper end near the upper rear corner of the heat distributor downwardly and forwardly.

The metal just forwardly of the slit 25 is bent outwardly as at 26 and the metal just rearwardly of the slit is bent inwardly as at 27 to cause the air to be directed laterally and rearwardly.

In the side 18 near the rear end, I have provided two slits 25, and I have similarly arranged the metal adjacent to them.

The reason for providing the two slits in the left-hand side of the heat distributor is that more air should be directed rearwardly and to the left from the heat distributor, which is ordinarily on the right-hand side of the car, being directly rearward from the exhaust manifold.

The flanges 21 are arranged to rest on the plate 16 and are provided with holes 28 to receive the bolts 29 by which the plate 16 is assembled and fastened to the floor board 12.

It will be obvious that changes may be made in the material of which my heat distributor is made and in the arrangement and construction of the details and parts, and it is my intention to cover by my claims, any modified forms of structure or use of mechanical equivalents, which may be reasonably included within their scope.

I claim as my invention:

1. A heat distributor adapted to be mounted over a heat opening in an inclined floor board of a vehicle, comprising a downwardly opening channel-shaped member open at its bottom, rear end, and having a top, sides and a closed forward end, said distributor having slits in its sides, and having portions shaped to direct hot air laterally.

2. A heat distributor adapted to be mounted over a heat opening in an inclined floor board of a vehicle, comprising a downwardly opening channel-shaped member open at its bottom, rear end and having a top, sides and a closed forward end, said distributor having slits in its sides, and having portions shaped to direct hot air laterally, the portions on both sides of the heat distributor being arranged to direct the air laterally and rearwardly and laterally and forwardly.

Des Moines, Iowa, December 22, 1925.

CHARLES L. SEIBEL.